United States Patent [19]

Berger

[11] Patent Number: 4,645,331

[45] Date of Patent: Feb. 24, 1987

[54] DEVICE FOR TRANSLATIONALLY PASSING MAGAZINES OR REVUES ON A COPIER APPARATUS

[75] Inventor: Jean-Claude Berger, Issoudun, France

[73] Assignee: Mecilec S.A., Paris, France

[21] Appl. No.: 734,814

[22] Filed: May 16, 1985

[30] Foreign Application Priority Data

May 16, 1984 [FR] France ................................ 84 07569

[51] Int. Cl.[4] ...................... G03B 27/32; G03B 27/62; G03B 27/52
[52] U.S. Cl. ........................................ 355/25; 355/75
[58] Field of Search .............................. 355/25, 82, 75

[56] References Cited

U.S. PATENT DOCUMENTS 4,395,115  7/1983  Tsuda et al. ........................... 355/25

Primary Examiner—Monroe H. Hayes
Attorney, Agent, or Firm—Mason, Fenwick & Lawrence

[57] ABSTRACT

A device to translationally pass a document having multiple sheets on a copier comprises an adapter element for placement on the portion of the copier housing the picture taking assembly, the adapter comprising a longitudinal plate and a transverse portion extending transversely from the longitudinal plate. The transverse portion has a longitudinal cross-section of substantially triangular outline for forming a planar surface with the portion of the copier housing the picture taking assembly. A longitudinal slide bar is positioned above and extends the length of the longitudinal plate and the transverse portion. A transparent plate bears the document to be carried and includes on one edge thereof means for slideably engaging the slide bar, whereby the bottom of the transparent plate can engage the lower drive apparatus of the copier and be driven thereby over the picture-taking assembly.

3 Claims, 1 Drawing Figure

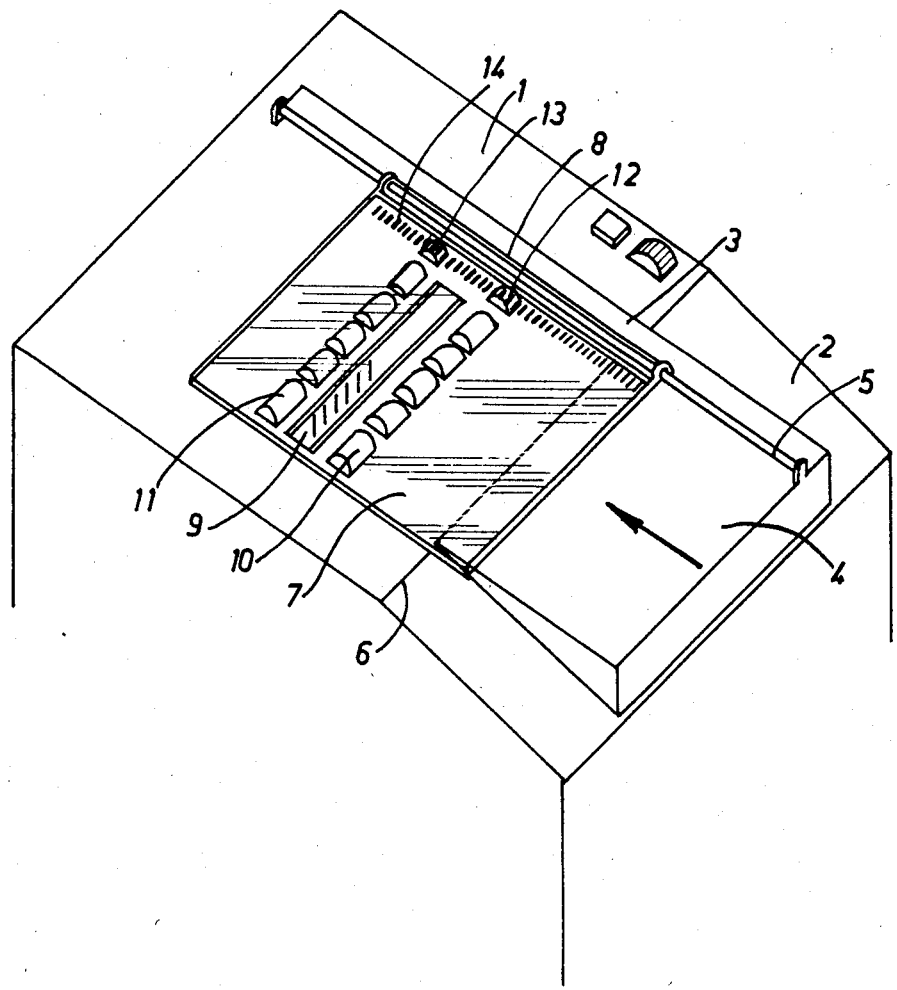

DEVICE FOR TRANSLATIONALLY PASSING MAGAZINES OR REVUES ON A COPIER APPARATUS

BACKGROUND OF THE INVENTION

1. Field of the Invention

The present invention concerns a device for translationally passing magazines or revues on an apparatus to produce copies from the original document.

2. Summary of the Prior Art

In fact, numerous reproduction machines already exist the upper portion of which is provided so as to cause to pass the sheets in translation before an illuminating window and to take pictures line by line, the original document being seized between pairs of driving rollers that ensure its regular moving forward. These devices present the drawback of not accepting sheets that have been stapled together, stuck, bound or otherwise, thereby rendering it necessary to separate the sheets, and thus constituting a serious drawback when it is desired to reproduce magazines or books. In these devices, the upper rollers can generally be dismantled to allow maintenance, and if necessary, the disengagement of an original document which might be incorrectly positioned.

The present invention applies more particularly to this type of copier and allows, by using an additional element that will be positioned on the copier, to pass through with security the assembled or bound entities.

SUMMARY OF THE INVENTION

The object of the present invention is a device for translationally passing magazines or revues on a copier comprising a fixed element wedged on the portion of the copier presenting the picture taking assembly, this element forming with the portion of the copier, a planar surface and presenting a longitudinal slide-bar along the length of which slides a transparent plate intended to bear the original document and engaging with the moving forward members of the copier.

The device according to the present invention comprises essentially a fixed element that is wedged on the upper plate of the copier and which presents a longitudinal slide-bar along the length of which can slide a transparent plate being displaced before the illumination assembly and the picture taking assembly according to the movement to be imposed upon the original, this plate being driven in translation by normal driving rollers of the original document or any other equivalent means, the plate being, furthermore, adapted to be developed in its return movement, for example, by angular rotation around the slide-bar.

BRIEF DESCRIPTION OF THE DRAWING

The single FIGURE is a top perspective view of the device according to the invention in association with the upper portion of a copier.

DETAILED DESCRIPTION OF A PREFERRED EMBODIMENT

In order to render more apparent the technical features and advantages of the present invention, an embodiment will be described herein-below, it being well understood that this embodiment is in no way limitative as to its putting into practice and the applications that can be made thereof.

Referring to the drawing, upper plate of the copier 1, is in the present example, an extended horizontal plane, joined on the side upstream from the path of the original documents illustrated by the arrow, by an inclined portion 2, forming together a broken plate 15. It is obvious that the invention can be adapted to all lay-outs, but it applies particularly well to this type of machine. This illustrates the fact that even if the upper plate is not planar, which is entirely possible with original documents in loose sheets, it is important that the device according to the invention, associated with the plate of the existing machine, forms a planar assembly, which is preferable for the passage of relatively inflexible magazines and even more so for books.

On this broken plate 15 an element is placed that will remain fixed, constituted in the present embodiment, by a longitudinal plate 3 having a transverse portion 4 extending transversely therefrom, the longitudinal cross-section of transverse portion 4 having a triangular outline in order to compensate the slope of portion 2. The internal edge of plate 3 is provided with slide-bar 5 that can be a rib, a bar or equivalent, preferably having a round section at least in the upper portion. This fixed element can be simply placed, particularly if the cooperating forms of the plate of the copier and of the element present wedging means such as ridge 6 or other simple means which can be provided for this purpose (studs and holes, ribs and grooves and equivalents). On this fixed element can slide longitudinally a transparent plate 7, for example, made of "crystal" type polymer (polyesters, polystyrene, polycarbonates and similar). This plate must interfere as little as possible with the taking of the picture. It presents longitudinally a groove or channel 8 or other hooking means on the slide-bar 5 that allows it to be translated longitudinally flat during the taking of the picture and to be raised, preferably, by angular rotation around the slide-bar 5 after taking of the picture in order to return to the starting point; it is particularly preferable that slide-bar 5 has at least in one portion a circular section that allows it to cooperate with groove or channel 8 or equivalent having an internal section at least in an arc of a circle. If this arc is slightly greater than 180°, this allows not only maintenance in place but, eventually, assembly or dismantling, for example, in order to clean plate 7.

The plate passes above illuminating and picture taking plaquette 9 line by line, from the original document and on the driving rollers 10 and 11. A simple vertical pressure can ensure the movement due to these rollers 10 and 11 which are generally made of rubber or similar, but it is preferable, in order to prevent an irregularity in the translation, to dispose cogged or milled wheels such as 12 and 13 coaxial with the rollers 10 and 11 and having the same effective diameter and engaging with a rack 14 or equivalent bands with which is provided on the internal face of plate 7.

It will thus be observed that starting from the right-hand side of the drawing, plate 7 driven by rollers 10 and 11 and/or wheels 12 and 13 is translated towards the left-hand side by causing to pass all its surface by the illuminating and picture taking plaquette 9.

It is possible to foresee on plaquette 7 wedging elements or even elements for fixing the magazines or the books. Any appropriate means can be envisaged.

It will also be noted that it is worthwhile, for optical reasons, that plate 7 be thin, which can thus be incompatible with good mechanical resistance, especially if it is desired to utilize this plate with books. It is thus possible to foresee a plate 7 having edges reinforced, for example, by overthicknesses or ribs, which thus can present the advantage of wedging the magazines or other original documents.

In particular, if it is desired to pass the documents of a commercial format that it is not desired to unstaple, it is possible to arrange that the frame closed by the ribs or equivalent constitutes at least on two sides the optimum wedging for the format involved.

It is also possible to envisage, for optical reasons, removing plaquette 9 of the copier when pictures are being taken with plate 7 in order to only insert between, on the one hand, the illuminating and picture taking assembly and on, the other hand, the original document an equivalent transparent parallel blade (having equal thickness and refraction index, for example).

I claim:

1. A device to translationally pass a document having multiple fastened sheets on a copier having a picture-taking assembly, removable upper drive means and non-removable lower drive means adapted to pass a single sheet, and a portion housing the picture-taking assembly, comprising:

an adapter element for placement on the portion of the copier housing having the picture-taking assembly, said adapter element comprising a longitudinal plate and a transverse portion extending transversely from said longitudinal plate, said transverse portion having a longitudinal cross-section of substantially triangular outline for forming a planar surface with the portion of the copier housing the picture-taking assembly;

a longitudinal slide bar positioned above and extending the length of said longitudinal and said transverse portion;

a transparent plate for bearing the document to be carried; and engagement means on one edge of said transparent plate for slideably engaging said slide bar, whereby the bottom of said transparent plate can engage the lower drive means of the copier and be driven thereby over the picture-taking assembly.

2. The device of claim 1, wherein the lower drive means of the copier includes meshing means and said transparent plate includes rack means for engaging said meshing means.

3. The device of claim 1 or 2, said slide bar having a circular cross-section, whereby said transparent plate can be raised by angular rotation around said slide bar for return of said transparent plate to the starting position.

* * * * *